United States Patent
Schoner et al.

(10) Patent No.: US 12,374,078 B1
(45) Date of Patent: Jul. 29, 2025

(54) BUILDING A CATALOG BASED ON OPTICAL RECOGNITION OF PATTERNS IN IMAGES

(71) Applicant: Scandit AG, Zurich (CH)

(72) Inventors: Bernd Schoner, New York, NY (US); Thibault Priquel, Zurich (CH); Oliver Akermann, Zurich (CH); Luc Humair, Zurich (CH)

(73) Assignee: Scandit AG, Zurich (CH)

( * ) Notice: Subject to any disclaimer, the term of this patent is extended or adjusted under 35 U.S.C. 154(b) by 0 days.

(21) Appl. No.: 18/404,518

(22) Filed: Jan. 4, 2024

Related U.S. Application Data

(63) Continuation of application No. 17/686,721, filed on Mar. 4, 2022, now Pat. No. 11,900,653, which is a
(Continued)

(51) Int. Cl.
*G06K 9/00* (2022.01)
*G06K 7/14* (2006.01)
(Continued)

(52) U.S. Cl.
CPC ......... *G06V 10/751* (2022.01); *G06K 7/1417* (2013.01); *G06K 7/1443* (2013.01); *G06K 7/1447* (2013.01); *G06T 7/73* (2017.01); *G06T 11/00* (2013.01); *G06V 10/42* (2022.01); *G06V 30/248* (2022.01)

(58) Field of Classification Search
CPC .......... G06K 9/00; G06Q 10/00; G06N 3/008; G06V 10/75

USPC ................ 382/100, 103, 106, 108, 112–113, 382/140–143, 168, 173, 180–181, 193, 382/209, 216, 219, 232, 254, 276, 382/286–291, 305, 317, 321; 705/14.24, 705/28, 9, 26; 345/633, 697
See application file for complete search history.

(56) References Cited

U.S. PATENT DOCUMENTS

| 4,167,756 A | 9/1979 | Smith |
| D344,261 S | 2/1994 | Watanabe |

(Continued)

FOREIGN PATENT DOCUMENTS

| EP | 3167404 A1 | 5/2017 |
| EP | 2195123 B1 | 5/2018 |

(Continued)

OTHER PUBLICATIONS

"Barcode and Zone OCR Capture", Docsvault, Available Online at: https://www.docsvault.com/docs/barcode-zone-ocr-capture.pdf, Dec. 22, 2021, 2 pages.
(Continued)

*Primary Examiner* — Seyed H Azarian
(74) *Attorney, Agent, or Firm* — Kilpatrick Townsend & Stockton LLP

(57) ABSTRACT

A camera on a robot is used to acquire images of a shelving unit. Locations of labels are detected and cropped from the images to form segments. The segments are analyzed to obtain scan descriptions, without decoding barcodes on the labels. The scan descriptions are compared to catalog descriptions to match scan descriptions to catalog descriptions. Products can then be mapped within an environment.

20 Claims, 8 Drawing Sheets

Related U.S. Application Data continuation of application No. 17/468,376, filed on Sep. 7, 2021, now Pat. No. 11,295,163, which is a continuation-in-part of application No. 17/016,896, filed on Sep. 10, 2020, now Pat. No. 11,615,610, which is a continuation of application No. 16/905,722, filed on Jun. 18, 2020, now Pat. No. 10,846,561, said application No. 17/468,376 is a continuation-in-part of application No. 17/244,251, filed on Apr. 29, 2021, now Pat. No. 11,514,665, which is a continuation-in-part of application No. 17/139,529, filed on Dec. 31, 2020, now Pat. No. 11,886,954, which is a continuation of application No. 16/920,061, filed on Jul. 2, 2020, now Pat. No. 10,963,658.

(60) Provisional application No. 63/221,252, filed on Jul. 13, 2021, provisional application No. 63/143,269, filed on Jan. 29, 2021, provisional application No. 63/019,818, filed on May 4, 2020, provisional application No. 63/003,675, filed on Apr. 1, 2020, provisional application No. 63/017,493, filed on Apr. 29, 2020.

(51) Int. Cl.
*G06T 7/73* (2017.01)
*G06T 11/00* (2006.01)
*G06V 10/42* (2022.01)
*G06V 10/75* (2022.01)
*G06V 30/24* (2022.01)
*G09G 5/00* (2006.01)

(56) References Cited

U.S. PATENT DOCUMENTS

| | | |
|---|---|---|
| 5,744,815 A | 4/1998 | Gurevich et al. |
| D473,872 S | 4/2003 | Ausems et al. |
| 6,580,453 B1 | 6/2003 | Hirasawa |
| D576,197 S | 9/2008 | Takagi |
| 7,457,407 B2 | 11/2008 | Sun et al. |
| D654,931 S | 2/2012 | Lemelman et al. |
| D658,174 S | 4/2012 | Tasselli et al. |
| D659,564 S | 5/2012 | Baxter |
| 8,223,203 B2 | 7/2012 | Ohsumi et al. |
| D667,823 S | 9/2012 | Merenda |
| D670,278 S | 11/2012 | Hamann |
| D672,386 S | 12/2012 | Matunuma et al. |
| D678,870 S | 3/2013 | Fathollahi |
| D678,936 S | 3/2013 | Oliver |
| D685,360 S | 7/2013 | Chen et al. |
| D688,654 S | 8/2013 | Stevinson |
| 8,596,540 B2 | 12/2013 | Adelmann |
| D698,772 S | 2/2014 | Merenda |
| 8,744,173 B2 | 6/2014 | Vincent et al. |
| D710,343 S | 8/2014 | Chandler, Jr. et al. |
| D710,346 S | 8/2014 | Smith et al. |
| 8,798,453 B2 | 8/2014 | Lawton |
| D716,285 S | 10/2014 | Chaney et al. |
| D716,785 S | 11/2014 | White |
| D717,287 S | 11/2014 | Macrina et al. |
| D717,304 S | 11/2014 | Yturralde et al. |
| D719,166 S | 12/2014 | Brown et al. |
| D719,167 S | 12/2014 | Brown et al. |
| D724,573 S | 3/2015 | Stevinson |
| D726,701 S | 4/2015 | Stevinson |
| 9,019,420 B2 | 4/2015 | Hurst et al. |
| D728,551 S | 5/2015 | Saeki et al. |
| D732,011 S | 6/2015 | Stevinson |
| D733,112 S | 6/2015 | Chaney et al. |
| D734,336 S | 7/2015 | Mistkawi et al. |
| D744,470 S | 12/2015 | Stevinson |
| D748,085 S | 1/2016 | Merenda |
| D754,114 S | 4/2016 | Curtis et al. |
| D754,650 S | 4/2016 | Curtis et al. |
| D759,004 S | 6/2016 | Stevinson |
| D760,209 S | 6/2016 | Weng et al. |
| D760,212 S | 6/2016 | Mao et al. |
| 9,378,435 B1 | 6/2016 | Prulhiere et al. |
| D760,710 S | 7/2016 | Ozolins et al. |
| D761,240 S | 7/2016 | Ozolins et al. |
| D768,617 S | 10/2016 | Merenda |
| D771,631 S | 11/2016 | Fitch et al. |
| 9,626,577 B1 | 4/2017 | Yu et al. |
| 9,654,675 B2 | 5/2017 | Kessler |
| 9,659,204 B2 | 5/2017 | Wu et al. |
| 9,836,635 B2 | 12/2017 | Negro et al. |
| 10,013,643 B2 | 7/2018 | Yellapragada et al. |
| 10,191,242 B2 | 1/2019 | Palmeri |
| 10,200,599 B1 | 2/2019 | Baldwin |
| 10,229,301 B2 | 3/2019 | Cumoli et al. |
| D860,180 S | 9/2019 | Lehmann et al. |
| D862,441 S | 10/2019 | Eppler et al. |
| 10,426,442 B1 | 10/2019 | Schnorr |
| 10,452,959 B1 | 10/2019 | Gautam et al. |
| 10,455,163 B2 | 10/2019 | Kanatsu |
| 10,489,668 B2 | 11/2019 | Quentin et al. |
| 10,558,844 B2 | 2/2020 | D'Ercoli et al. |
| 10,621,435 B2 | 4/2020 | Bridges et al. |
| 10,818,014 B2 | 10/2020 | Xu et al. |
| 10,846,561 B1 | 11/2020 | Floerkemeier et al. |
| 10,963,658 B1 | 3/2021 | Bloch et al. |
| 11,003,891 B2 | 5/2021 | Chen |
| 11,087,105 B1 | 8/2021 | Biasini et al. |
| 11,216,628 B2 | 1/2022 | Scherly et al. |
| 11,244,147 B2 | 2/2022 | Floerkemeier et al. |
| 11,290,643 B1 | 3/2022 | Tullis et al. |
| 11,295,163 B1 | 4/2022 | Schoner et al. |
| 11,403,477 B1 | 8/2022 | Biasini et al. |
| 11,495,036 B1 | 11/2022 | Kündig et al. |
| 11,514,665 B2 | 11/2022 | Nater et al. |
| 11,532,149 B1 | 12/2022 | Floerkemeier et al. |
| 11,615,610 B1 | 3/2023 | Floerkemeier et al. |
| 11,636,709 B2 | 4/2023 | Floerkemeier et al. |
| 11,803,718 B1 | 10/2023 | Scherly et al. |
| 11,803,719 B1 | 10/2023 | Biasini et al. |
| 11,869,258 B1 | 1/2024 | Kündig et al. |
| 11,886,954 B2 | 1/2024 | Nater et al. |
| 11,900,653 B1 | 2/2024 | Schoner et al. |
| 2003/0059124 A1 | 3/2003 | Center, Jr. |
| 2003/0202697 A1 | 10/2003 | Simard et al. |
| 2004/0193538 A1 | 9/2004 | Raines |
| 2004/0206822 A1 | 10/2004 | Crandall |
| 2006/0011724 A1 | 1/2006 | Joseph et al. |
| 2006/0075241 A1 | 4/2006 | Deguillaume et al. |
| 2006/0249581 A1 | 11/2006 | Smith |
| 2007/0116454 A1 | 5/2007 | Tsai |
| 2009/0002797 A1 | 1/2009 | Kwong et al. |
| 2009/0033786 A1 | 2/2009 | Finkelstein et al. |
| 2009/0108071 A1 | 4/2009 | Carlson |
| 2009/0212113 A1 | 8/2009 | Chiu et al. |
| 2009/0304234 A1 | 12/2009 | Kondo et al. |
| 2010/0102129 A1 | 4/2010 | Drzymala et al. |
| 2010/0252633 A1 | 10/2010 | Barkan et al. |
| 2010/0328420 A1 | 12/2010 | Roman |
| 2011/0007205 A1 | 1/2011 | Lee |
| 2011/0043683 A1 | 2/2011 | Beach et al. |
| 2011/0081946 A1 | 4/2011 | Singh |
| 2011/0168776 A1 | 7/2011 | Jalali et al. |
| 2013/0076697 A1 | 3/2013 | Goertz et al. |
| 2013/0112750 A1 | 5/2013 | Negro et al. |
| 2013/0147839 A1 | 6/2013 | Fukushima et al. |
| 2013/0206839 A1 | 8/2013 | Gao |
| 2013/0329115 A1 | 12/2013 | Palmeri |
| 2014/0025973 A1 | 1/2014 | Schillings et al. |
| 2014/0027503 A1 | 1/2014 | Kennedy et al. |
| 2014/0168468 A1 | 6/2014 | Levoy et al. |
| 2014/0171150 A1 | 6/2014 | Hurst et al. |
| 2014/0232930 A1 | 8/2014 | Anderson |
| 2014/0247278 A1 | 9/2014 | Samara et al. |
| 2014/0285913 A1 | 9/2014 | Palmeri |
| 2014/0327815 A1 | 11/2014 | Auger |
| 2014/0344729 A1 | 11/2014 | Blanco et al. |

(56) References Cited

U.S. PATENT DOCUMENTS

| | | | |
|---|---|---|---|
| 2015/0048167 | A1 | 2/2015 | Russell et al. |
| 2015/0053765 | A1 | 2/2015 | Powell et al. |
| 2015/0116547 | A1 | 4/2015 | Laroia |
| 2015/0220766 | A1 | 8/2015 | Russell et al. |
| 2015/0363625 | A1* | 12/2015 | Wu .................. G06K 7/1447 382/203 |
| 2016/0042315 | A1 | 2/2016 | Field-Darragh et al. |
| 2016/0070944 | A1 | 3/2016 | McCloskey et al. |
| 2016/0077307 | A1 | 3/2016 | Palmeri |
| 2016/0104021 | A1 | 4/2016 | Negro et al. |
| 2016/0171707 | A1 | 6/2016 | Schwartz |
| 2016/0188941 | A1 | 6/2016 | Todeschini et al. |
| 2016/0219218 | A1 | 7/2016 | Kinoshita |
| 2016/0253599 | A1 | 9/2016 | Lang et al. |
| 2016/0307006 | A1* | 10/2016 | Wang .................. G07C 9/257 |
| 2016/0321819 | A1 | 11/2016 | Morgan-Mar et al. |
| 2016/0323508 | A1 | 11/2016 | Ayalasomayajula et al. |
| 2016/0366348 | A1 | 12/2016 | Dixon et al. |
| 2017/0013179 | A1 | 1/2017 | Kang et al. |
| 2017/0032311 | A1 | 2/2017 | Rizzolo et al. |
| 2017/0041540 | A1 | 2/2017 | Foster et al. |
| 2017/0185400 | A1 | 6/2017 | Shanbhogue et al. |
| 2017/0243097 | A1 | 8/2017 | Loy et al. |
| 2017/0286732 | A1 | 10/2017 | Lei et al. |
| 2017/0286901 | A1* | 10/2017 | Skaff .................. G06V 10/751 |
| 2018/0081417 | A1 | 3/2018 | Chan et al. |
| 2018/0120106 | A1 | 5/2018 | Sato |
| 2018/0122194 | A1 | 5/2018 | Schoner |
| 2018/0137319 | A1 | 5/2018 | Giordano et al. |
| 2018/0139337 | A1 | 5/2018 | Ghazizadeh |
| 2018/0157885 | A1 | 6/2018 | Gurzumar |
| 2018/0314908 | A1 | 11/2018 | Lam |
| 2018/0342050 | A1 | 11/2018 | Fitzgerald et al. |
| 2019/0065803 | A1 | 2/2019 | Burke et al. |
| 2019/0122012 | A1 | 4/2019 | Lei et al. |
| 2019/0188435 | A1 | 6/2019 | Davis et al. |
| 2019/0213523 | A1 | 7/2019 | Adato et al. |
| 2019/0244043 | A1* | 8/2019 | Bradley .................. G06V 30/224 |
| 2019/0304132 | A1 | 10/2019 | Yoda et al. |
| 2019/0325183 | A1 | 10/2019 | Tscherepanow et al. |
| 2019/0354923 | A1 | 11/2019 | Taira et al. |
| 2020/0034782 | A1* | 1/2020 | Hsieh .................. G06Q 30/0627 |
| 2020/0042803 | A1 | 2/2020 | Yamaguchi |
| 2020/0084375 | A1 | 3/2020 | Tadano et al. |
| 2020/0202095 | A1 | 6/2020 | Yoda |
| 2020/0258033 | A1 | 8/2020 | Yonezawa et al. |
| 2020/0320324 | A1* | 10/2020 | Goncalves ......... G06V 30/1444 |
| 2021/0125141 | A1 | 4/2021 | Lipsey et al. |
| 2021/0150618 | A1 | 5/2021 | Glaser et al. |
| 2021/0158278 | A1* | 5/2021 | Bogolea .................. G06Q 10/087 |
| 2021/0192162 | A1 | 6/2021 | Rodriguez et al. |

FOREIGN PATENT DOCUMENTS

| | | |
|---|---|---|
| JP | 2004032507 A | 1/2004 |
| JP | 4966464 B2 | 7/2012 |
| JP | 2019094191 A | 6/2019 |
| KR | 20020077090 A | 10/2002 |
| KR | 20060102957 A | 9/2006 |
| WO | 0131893 A1 | 5/2001 |
| WO | 2016007662 A1 | 1/2016 |
| WO | 2019135163 A2 | 7/2019 |

OTHER PUBLICATIONS

"Code Reader 4405 User Manual", Code Product Line, Version 03, Available Online at: https://web.archive.org/web/20170624204013/http://codecorp.com/assets/manual/D018433-CR44X5--User-Manual.pdf, Jan. 2016, pp. 1-16.

"Computer Vision and Augmented Reality for Enterprise Applications", Scandit, Available Online at: https://www.scandit.com/resources/videos/computer-vision-and-augmented-reality-for-enterprise-applications, Jun. 6, 2018, pp. 1-2.

"ISBN Scan—OCR/BarcodeScanner", App Store Preview, Leontec, Designed for iPad, Available Online at: https://apps.apple.com/us/app/isbn-scan-ocr-barcodescanner/id891627785, Accessed from Internet on Jan. 17, 2022, 3 pages.

"Linea Pro Extreme Rugged Case", Infinite Peripherals, iOS Accessories, Linea Pro and Infinea Tab Accessories, Available Online at: https://web.archive.org/web/20150825044354/http://ipcprint.com/linea-pro-extreme-rugged-case.html, Accessed from Internet on Dec. 24, 2020, pp. 1-3.

"Scandit Augmented Reality for Smart Devices", Scandit, Available Online at: https://www.scandit.com/resources/videos/scandit-augmented-reality-for-smart-devices/, Oct. 2, 2019, pp. 1-2.

"Scandit Augmented Reality Retail Click and Collect", Scandit, Available Online at: https://www.scandit.com/resources/videos/scandit-augmented-reality-retail-click-and-collect/, Sep. 26, 2018, pp. 1-2.

"Scandit Augmented Reality Retail Price Label Verification", Scandit, Available Online at: https://www.scandit.com/resources/videos/scandit-augmented-reality-retail-price-label-verification/, Sep. 26, 2018, 1 page.

"Scandit Augmented Reality Retail Shelf Management", Scandit, Available Online at: https://www.scandit.com/resources/videos/scandit-augmented-reality-retail-shelf-management/, Sep. 26, 2018, pp. 1-2.

"Scandit Augmented Retail Product Information Using AR", Scandit, Available Online at: https://www.scandit.com/resources/videos/scandit-augmented-retail-product-information-using-ar/, Sep. 26, 2018, pp. 1-2.

"Structure of the IMEI and IMEISV (IMEI Software Version)", Available Online at: https://en.wikipedia.org/wiki/International_Mobile_Equipment_Identity#Structure_of_the_IMEI_and_IMEISV_(IMEI_software_version), Nov. 29, 2021, 2 pages.

"Use OCR to Scan ISBN or UPC Number When There is No Barcode", A sellertool Solutions User Guide, Available Online at: https://www.asellertool.com/manual/1/en/topic/ocr-to-capture-isbn-number-if-no-barcode, Feb. 9, 2017, 12 pages.

Basilico, "Flens—The First Flashlight Booster for Smartphones", Available Online at: https://www.kickstarter.com/projects/basilico/flens-the-first-flashlight-booster-for-smartphones, Accessed from Internet on: Mar. 26, 2021, 26 pages.

Brownlee, "Deep Learning Models for Human Activity Recognition", Deep Learning for Time Series, Available Online at: https://machinelearningmastery.com/deep-learning-models-for-human-activity-recognition/, Sep. 26, 2018, 16 pages.

Application No. PCT/IB2019/000049, International Preliminary Report on Patentability, Mailed on Jul. 23, 2020, 11 pages.

Application No. PCT/IB2019/000049, International Search Report and Written Opinion, Mailed on Aug. 1, 2019, 15 pages.

PCT/IB2019/000049, "Invitation to Pay Additional Fees and, Where Applicable, Protest Fee", Mailed on Jun. 11, 2019, 10 pages.

Application No. PCT/US2012/043184, International Preliminary Report on Patentability, Mailed on Jan. 9, 2014, 6 pages.

Application No. PCT/US2012/043184, International Search Report and Written Opinion, Mailed on Feb. 27, 2013, 7 pages.

Application No. PCT/US2021/025212, International Preliminary Report on Patentability, Mailed on Oct. 13, 2022, 8 pages.

Application No. PCT/US2021/025212, International Search Report and Written Opinion, Mailed on Aug. 12, 2021, 11 pages.

PCT/US2021/025212, "Invitation to Pay Additional Fees and, Where Applicable, Protest Fee", Jun. 17, 2021, 2 pages.

\* cited by examiner

BUILDING A CATALOG BASED ON OPTICAL RECOGNITION OF PATTERNS IN IMAGES

CROSS REFERENCE TO RELATED APPLICATIONS

This application is a continuation of U.S. patent application Ser. No. 17/686,721, filed Mar. 4, 2022, which is a continuation of U.S. patent application Ser. No. 17/468,376, filed Sep. 7, 2021, now U.S. Pat. No. 11,295,163, issued on Apr. 5, 2022, which application claims priority to U.S. Provisional Application No. 63/221,252, filed on Jul. 13, 2021. The disclosures of these applications are incorporated by reference for all purposes.

U.S. patent application Ser. No. 17/468,376, filed Sep. 7, 2021, claims priority to U.S. Provisional Application No. 63/143,269, filed on Jan. 29, 2021. The disclosures of these applications are incorporated by reference for all purposes.

U.S. patent application Ser. No. 17/468,376, filed Sep. 7, 2021, is a continuation-in-part of U.S. patent application Ser. No. 17/016,896, filed on Sep. 10, 2020, now U.S. Pat. No. 11,615,610, issued on Mar. 28, 2023, which is a continuation of U.S. patent application Ser. No. 16/905,722, filed on Jun. 18, 2020, now U.S. Pat. No. 10,846,561, issued on Nov. 24, 2020, which claims priority to U.S. Provisional Application No. 63/019,818, filed on May 4, 2020, and No. 63/003,675, filed on Apr. 1, 2020. The disclosures of these applications are incorporated by reference for all purposes.

U.S. patent application Ser. No. 17/468,376, filed Sep. 7, 2021, is a continuation-in-part of U.S. patent application Ser. No. 17/244,251, filed on Apr. 29, 2021, now U.S. Pat. No. 11,514,665, issued on Nov. 29, 2022, which is a continuation-in-part of U.S. patent application Ser. No. 17/139,529, filed on Dec. 31, 2020, which is a continuation of U.S. patent application Ser. No. 16/920,061, filed on Jul. 2, 2020, now U.S. Pat. No. 10,963,658, issued on Mar. 30, 2021, which claims priority to U.S. Provisional Application No. 63/017,493, filed on Apr. 29, 2020. The disclosures of these applications are incorporated by reference for all purposes.

BACKGROUND

This disclosure generally relates to image analysis of optical patterns. Barcodes have traditionally been scanned using a specialized scanner. For example, a barcode scanner comprising a laser is used to shine light on a barcode, and reflected light from the barcode is detected and used to decode the barcode. As mobile devices (e.g., smartphones and tablets) with cameras have become more common, mobile devices are being used to decode codes by acquiring an image of a code and using image analysis to decode the code. An example of a method for using a smartphone to decode a barcode is provided in U.S. Pat. No. 8,596,540, granted on Dec. 3, 2013.

BRIEF SUMMARY

This disclosure generally relates to decoding optical patterns. More specifically, and without limitation, this disclosure relates to using a vehicle and a camera to decode optical patterns in images of a real scene.

In some embodiments, a system for recognition of optical patterns in images comprises one or more cameras configured to acquire a plurality of images of a plurality of shelf displays in a retail environment and one or more processors. The one or more processors are configured to: receive the plurality of images; detect locations of a plurality of labels in the plurality of images, wherein the plurality of labels each contain a barcode and product information of a product for sale in the retail environment, and the product information contains letters and/or numbers; ascertain boundaries of the plurality of labels in the plurality of images; crop each of the plurality of images to obtain a plurality of image segments, based on ascertaining the boundaries of the plurality of labels in the plurality of images; analyze the product information on each image segment of the plurality of image segments to obtain a plurality of scan descriptions, without decoding barcodes on the plurality of labels; access a database comprising a plurality of catalog descriptions of products in the retail environment; and/or match scan descriptions of the plurality of scan descriptions to catalog descriptions of the plurality of catalog descriptions. In some configurations, the one or more cameras comprises two cameras; the two cameras are fixed in relation with each other; matching one scan description of the plurality of scan descriptions to one catalog description of the plurality of catalog descriptions is performed more than once using more than one image segment of a label of the plurality of labels, to increase a probability of a correct match; the plurality of catalog descriptions each comprise a stock keeping unit (SKU); and/or the one or more processors are configured to: receive position data of images within the retail environment and/or map SKUs from the plurality of catalog descriptions to position data of images to create a map of products in the retail environment.

In some embodiments, a method for recognition of optical patterns in images comprises receiving a plurality of images of a plurality of shelf displays in a retail environment; detecting locations of a plurality of labels in the plurality of images, wherein the plurality of labels each contain a barcode and product information of a product for sale in the retail environment, and the product information contains letters and/or numbers; ascertaining boundaries of the plurality of labels in the plurality of images; cropping each of the plurality of images to obtain a plurality of image segments, based on ascertaining the boundaries of the plurality of labels in the plurality of images; analyzing the product information on each image segment of the plurality of image segments to obtain a plurality of scan descriptions, without decoding barcodes on the plurality of labels; accessing a database comprising a plurality of catalog descriptions of products in the retail environment; and/or matching scan descriptions of the plurality of scan descriptions to catalog descriptions of the plurality of catalog descriptions. In some configurations, two or more image segments of the plurality of image segments are from one image; the plurality of catalog descriptions each comprise a SKU; the method further comprises receiving position data of images within the retail environment and mapping SKUs of the plurality of catalog descriptions to position data of images to create a map of products in the retail environment; matching scan descriptions to catalog descriptions comprises measuring a relative Levenshtein distance between at least a portion of each scan description to the catalog descriptions; the plurality of image segments are aggregated into one or more patchwork images before analyzing the product information on each image segment of the plurality of image segments; a subset of characters of the product information are selected as a scan description based on the subset of characters being located in a particular area of a label of the plurality of labels. the plurality of images and/or the plurality of image segments are compressed before analyzing the product information on each image segment of the plurality of image segments; the plurality of images are received at a remote server for processing; the plurality of images are acquired by one or more cameras attached to a vehicle; the retail environment is indoors; the method further comprises tracking the vehicle in the retail environment, and linking position data of the vehicle with the plurality of images; tracking uses Ultra-Wideband (UWB) technology; the method further comprises building the database using high resolution images of the plurality of shelf displays and scanning barcodes on the plurality of labels before receiving the plurality of images of the plurality of shelf displays; the method further comprises performing error detection, before matching the scan descriptions to catalog descriptions; error detection comprises one or more of the following: using redundancy of one label of the plurality of labels in more than one image segment of the plurality of image segments; analyzing starting strings in the scan descriptions and comparing the starting strings to a known starting string; ascertaining that characters of the scan descriptions comprise parity and/or one or more hash numbers; and/or comparing the scan descriptions to a known string length.

In some embodiments, a method for creating a catalog of descriptions comprises acquiring a plurality of high-resolution images of a plurality of shelf displays in a retail environment; detecting locations of a plurality of labels in the plurality of images, wherein the plurality of labels each contain a barcode and product information of a product for sale in the retail environment, and the product information contains letters and/or numbers; cropping the plurality of images to obtain a plurality of image segments, based on detecting locations of label in the plurality of images, wherein an image segment comprises at least a portion of a label; decoding the barcodes to retrieve a product identifier; analyzing product information on each segment of the plurality of image segments to a plurality of scan descriptions; and/or recording a database comprising catalog descriptions of products in the retail environment along with the product identifiers.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
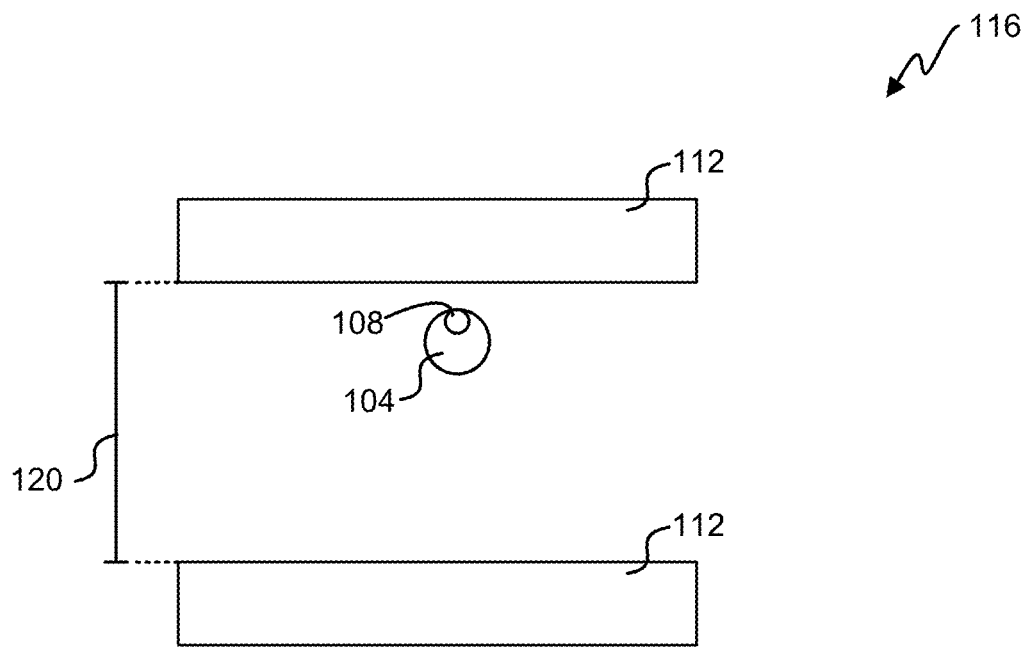
FIG. 1 depicts an embodiment of a vehicle with a camera acquiring images of shelves in a retail environment.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Examples of optical patterns include 1D barcodes, 2D barcodes, numbers, letters, and symbols. As scanning optical patterns is moved to mobile devices, there exists a need to increase scanning speed, increase accuracy, and/or manage processing power. Interpreting an optical pattern (e.g., scanning for an optical pattern) can be divided into two steps: detecting and decoding. In the detecting step, a position of an optical pattern within an image is identified and/or a boundary of the optical pattern is ascertained. In the decoding step, the optical pattern is decoded (e.g., to provide a character string, such as a numerical string, a letter string, or an alphanumerical string). As optical patterns, such as 1D barcodes and 2D barcodes (e.g., QR codes), are used in many areas (e.g., shipping, retail, warehousing, travel), there exists a need for quicker scanning of optical patterns. In some embodiments, optical patterns can include alpha and/or numerical characters. The following are techniques that can increase the speed, accuracy, and/or efficiency of scanning for optical patterns. The following techniques can be used individually, in combination with each other, and/or in combination with other techniques.

In some configurations, a camera on a vehicle (e.g., a robot) is used to acquire information. For example, one or more cameras on a scrubber (e.g., driven by a person or autonomously controlled) can be used to read data from labels in a store. If the location of the vehicle is known (e.g., a self-driving scrubber having a pre-defined route) while acquiring images, then products in a retail environment can be mapped. In some environments, characters (such as letters, numbers, symbols) are easier to read than barcodes. For example, barcodes are smaller than characters (e.g., on a label) and/or barcodes are nonexistent (e.g., on a license plate of an automobile). By using one or more cameras attached to a vehicle, data about an environment can be acquired while the vehicle travels through the environment.

Though some embodiments disclosed relate to a retail environment, such as a store, there are other applications. For example, a camera on a vehicle could be used to detect and decode characters on license plates of cars in a large parking lot (e.g., for rental car asset management, car dealer management, or for parking fee enforcement). Another example is scanning labels in a warehouse.

FIG. 1 depicts an embodiment of a vehicle 104 with a camera 108 acquiring images of shelving units 112 in an environment 116 (e.g., a retail environment). The vehicle 104 and the camera 108 are part of a system for recognizing optical patterns in images. The camera 108 and/or other sensors can be attached to, or integrated with, the vehicle 104. Examples of a vehicle 104 can include autonomous cleaning machines, cleaning machines, golf carts, trucks, cars, self-driving cars, drones, autonomous drones, forklifts, shopping carts, and shopping baskets. One or more cameras 108 and/or sensors can also be attached to a person by using wearable cameras/body cameras (e.g., that continuously monitor the environment).

The camera 108 comprises an image sensor and one or more lenses to focus light on the image sensor. The shelving unit 112 comprises one or more shelf displays. A shelf display provides a space for a product and a label identifying the product for sale (e.g., the label comprises a description, price, and/or barcode).

As the vehicle 104 travels through aisles 120 (e.g., between shelfing units 112) the camera 108 acquires images of the shelf displays that are part of the shelving units 112 in a retail environment. One or more processors (e.g., as part of the vehicle 104, the camera 108, and/or another device, including, but not limited to, a mobile device, a smartphone, a tablet, a notepad, a laptop, a desktop, and/or a server) are configured to read text and/or numbers from the labels to generate a scan description. In some embodiments, a barcode on a label is not decoded because there is not enough resolution in an image to decode the barcode, whereas the description and/or price can be larger than the barcode and thus more easily decoded (e.g., by optical character recognition (OCR)). The scan description is then compared to a database containing a catalog of products for sale, to match the scan description with a catalog description. A position of the vehicle 104 within the environment 116, and/or an orientation of the camera 108 with respect to the vehicle 104 and/or the environment 116, is known and/or ascertained. A position of the product for sale within the environment 116 can then be mapped, without decoding the barcodes on the labels.

The one or more processors receive the plurality of images acquired by the camera 108 of shelf displays. The plurality of images include a plurality of labels identifying product for sale at the shelf displays. Labels can be below, to a side, or above the product for sale. The plurality of labels each contain a barcode and product information of a product for sale. The product information contains letters and/or numbers (e.g., a price and a description).

Locations of the plurality of labels are detected in the plurality of images. For example, machine learning can be used to identify label locations in images. In some embodiments, identifying label locations in images is performed without machine learning (e.g., using thresholding or edge detection algorithms with a morphological operation, masking to single out objects, labeling to create a list of objects in an image, and/or classifying objects in the list of objects).

Boundaries of the plurality of labels are ascertained in the plurality of images. For example, gradient analysis is used for edge detection, since many labels have a white background. The plurality of images are cropped (e.g., at the boundaries, at buffered distance from the boundaries, or a predetermined portion of the label, such an upper left quarter of the label) to obtain a plurality of image segments. There can be several image segments from one image. For example, there could be two, three, five, seven, or more labels in one image that are segmented. The images are segmented to reduce processing resources and/or memory storage, in some embodiments.

The plurality of image segments are analyzed to obtain product information. For example, the plurality of image segments are decoded using OCR to obtain scan descriptions. In some embodiments, barcodes (e.g., one dimensional or two dimensional barcodes, such as a QR code) are not decoded (e.g., because the barcode has a lower resolution than the product information). A database comprising a plurality of catalog descriptions is accessed, and scan descriptions are matched with catalog descriptions. In some embodiments a label is detected carrying a numeric code, for example a pallet ID. In some embodiments, individual products carry a machine and/or human readable code, e.g., a linear barcode or a 2D barcode or a QR code, and/or an alphanumeric character string. In some embodiment text or numerical information found on price labels or product packaging is analyzed for special content. Examples include "only one per customer", "Special", "Promotion", "Promotion Expiration Date", "Clearance", or a specific date. In some embodiments the price on the price label is decoded. In some embodiments the amount of inventory of a specific product is estimated. For example, the height of a packed pallet is estimated. Given the known or estimated size of individual product packages, the total number of products on the pallet can be estimated. In some embodiments, the presence or absence of a pallet is detected in one or more images. In some embodiments, empty pallet locations or bins are specifically detected and reported. In some embodiments, pallets are identified that do not carry an identifying label (e.g., by training a machine learning model to recognize a pallet and/or also recognize an open bin). In some embodiments, images are used for planogram compliance.

In some configurations, the vehicle 104 supports two or more cameras 108 and/or four, five, or fewer cameras 108 (e.g., cameras 108 attached to the vehicle 104). In some embodiments, two or more cameras 108 are connected with the vehicle using a pole (e.g., a vertical pole, and/or the two or more cameras 108 are spaced vertically from each other on the pole. The two or more cameras 108 are fixed in relation to each other, have a fixed lens, and/or have a fixed focus (e.g., in the far field), for more precisely mapping locations of labels within the environment 116.

In some embodiments, there is a lower camera and an upper camera, wherein the lower camera is configured to acquire images of lower shelves and the upper camera is configured to acquire images of upper shelves. Applicant has found that using two or more cameras to acquire images of some shelves (e.g., where cameras 108 are vertically spaced from each other) is more beneficial than using one camera so that labels are not as distorted in images. There is a tradeoff between field of view and number of cameras. If the field of view is too wide, there can be too much distortion in images. However, the more cameras used then the more computational resources needed to process the images. However, using multiple cameras can also allow the vehicle to get closer to a shelf. Applicant has found that two to four cameras (e.g., two or three) in a retail environment is a good tradeoff between field of view and not having too many cameras. Though in some configurations, one camera is used (e.g., to detect license plates or on a drone). In some configurations five cameras could be used). In some embodiments, the upper camera and the lower camera are oriented to point horizontally and/or parallel with each other (e.g., parallel with the floor), and/or the distance between the upper camera and the lower camera is equal to or greater than 12, 18, or 24 inches and equal to or less than 24, 36, 48, or 60 inches (e.g., to image displays at different heights).

In some configurations, a third camera is mounted on the vertical pole (e.g., on top of the vertical pole) and/or angled upward to acquire images of upper steel or reserve steel. In some configurations, less than four or five cameras are used to reduce an amount of data collected at one time.

As the vehicle 104 travels by shelving units 112, hundreds or thousands of images can be acquired by one or more cameras 108, depending on a size of a store (e.g., in some retail environments, forty to sixty thousand images are acquired). By acquiring many images, there are commonly multiple images of each label. For example, there can be 2, 3, 5, or more images of one label and/or 5, 9, 15, 20, or fewer images of one label. Having multiple images of each label can be beneficial because some optical patterns cannot be read in some images (e.g., glare on the label from a light at a first angle in a first image, but as the vehicle 104 moves, the glare moves to a second angle in a second image and the label can be read in the second image), and/or multiple images can be used for redundancy (e.g., for confirmation a match between a scan description and a catalog description). In some configurations, information of a label from multiple images is used. For example, if a first part of the label can be decoded in the first image and a second part of the label can be decoded in the second image, the label can be decoded based on a combination of the first image and the second image.

In some embodiments, matching one scan description of a plurality of scan descriptions to one catalog description of the plurality of catalog descriptions is performed more than once using more than one image segment of a label of the plurality of labels, to increase a probability of a correct match.

Figure 2:
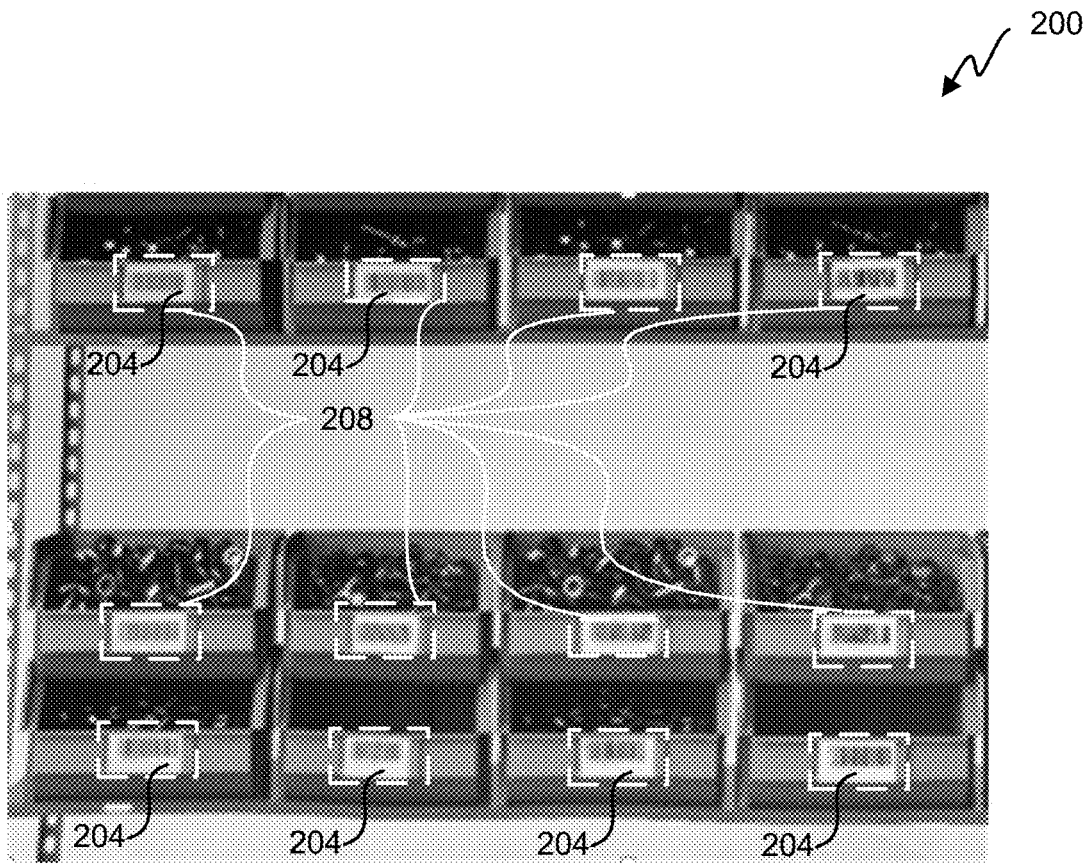
FIG. 2 depicts an embodiment of an image being segmented based on detecting labels in the image.

FIG. 2 depicts an embodiment of an image 200 being segmented based on detecting labels 204 in the image 200. Decoding optical patterns in many images can be computationally intense. In some configurations, images (e.g., down-sampled images) are transmitted to a remote server for processing. In some configurations, a computing device attached with the vehicle, or in the environment (a tablet electronically connected with the vehicle using a wireless connection, such as WiFi or Bluetooth), is used to process images.

Locations of labels 204 are identified and the image 200 is segmented into a plurality of image segments 208. Product information on the labels 204 are analyzed. For example, one, two, or three lines of description are decoded (e.g., extracted) using OCR. In some embodiments, the image 200 is down sampled before analysis to conserve bandwidth. Applicant has found OCR could be performed accurately on relatively low resolution images. Accordingly, in some embodiments a barcode cannot be decoded in an image (e.g., because the barcode is too small; or there is not sufficient resolution, such as when there is no more than one pixel per bar of the barcode). In some configurations, if barcodes can be read, then barcodes are decoded.

In some embodiments, low resolution is equal to or less than 220, 250, 300, 350, or 400 pixels per width of a label and/or equal to or greater than 100 or 200 pixels per width of label. In some embodiments, the camera is equal to or less than 1500, 1700, or 2000 millimeters from a label while acquiring an image of the label and/or equal to or greater than 400, 500, 750, or 1000 mm from the label while acquiring an image of the label. For example, the camera is equal to or between 1000 and 2000 mm from the label while acquiring an image of a label that is 200 mm wide (e.g., a "full-width label") and/or equal to or between 500 and 1000 mm from the label while acquiring an image of a label that is 100 mm wide (e.g., a "half-width label").

Decoded characters are compared with a catalog to obtain a stock keeping unit (SKU). Thus, the SKU can be electronically obtained without decoding a barcode, in some configurations. The SKU can be mapped within the environment using a location of the vehicle at the time an image is acquired. Thus, a digital map of the store can be created using the camera coupled with the vehicle.

Though the image 200 in FIG. 2 depicts barcodes. Other labels, such as those shown in FIG. 5, have large characters and a small barcode because the characters are meant to be human readable and the barcode is not.

In some embodiments, "bin tags" (e.g., identifiers of individual shelves or shelf modules) are scanned. Scanning can be done with barcode scanning and/or OCR. In some embodiments, OCR is used for scanning low resolution images (e.g., for a periodic store sweep to map products in the store), and barcode scanning is performed on high-resolution images (e.g., less frequently to build a product catalog).

Various strings and/or data can be decoded on a price label, including: price, promotion price, promotion type, date(s), promotion expiry date(s), nutritional information, information about an origin of the product, manufacturer, product facings count, and/or unit price(s). Use of OCR can be used to decode text strings on products and/or identify products. OCR can be used in combination with object recognition. In some embodiments, a radio frequency (RF) and/or radio frequency identification (RFID) sensor can be used to detect a product (e.g., in addition to using one or more cameras). In some embodiments, the color of a price label is estimated, which often carries a particular meaning. For example, many retailers use white labels for regular pricing and yellow or orange labels for promotions.

Figure 3:
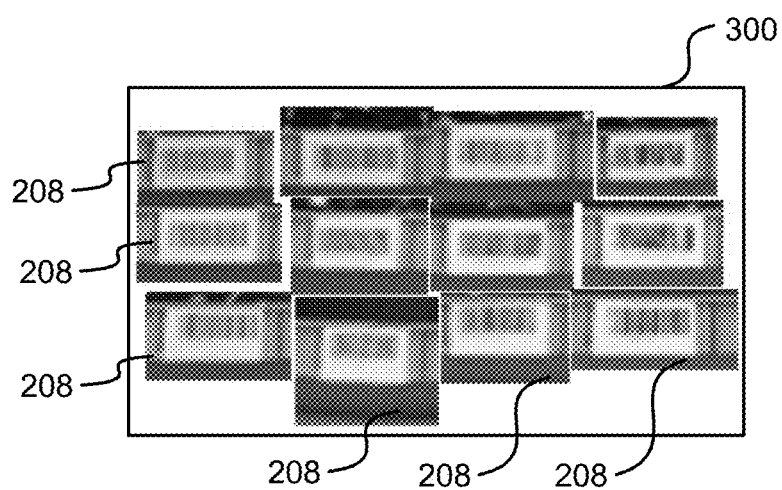
FIG. 3 depicts an embodiment of a patchwork image.

FIG. 3 depicts an embodiment of a patchwork image 300. The patchwork image 300 is a combination of image segments 208 from FIG. 2. In some embodiments, one or more patchwork images 300 are used for analysis (e.g., instead of individual, whole images, such as image 200 in FIG. 2). Thus, a plurality of image segments 208 are aggregated into one or more patchwork images 300 before analyzing product information on each image segment 208 of the plurality of image segments 208. By using the patchwork image 300, a number of API calls to the OCR engine can be reduced. Reducing API calls can be beneficial when charges for using an OCR engine is based on a number of API calls. Also uploading a full image to the cloud can be slow. In some embodiments, an OCR engine that runs locally is used and/or the patchwork image is not used.

The image segments 208 in the patchwork image 300 can be from the same image or from multiple images (e.g., one or more image segment 208 from each image). In some embodiments, the patchwork image 300 comprises image segments for a shelving unit (e.g., shelving unit 112 in FIG. 1).

Figure 4:
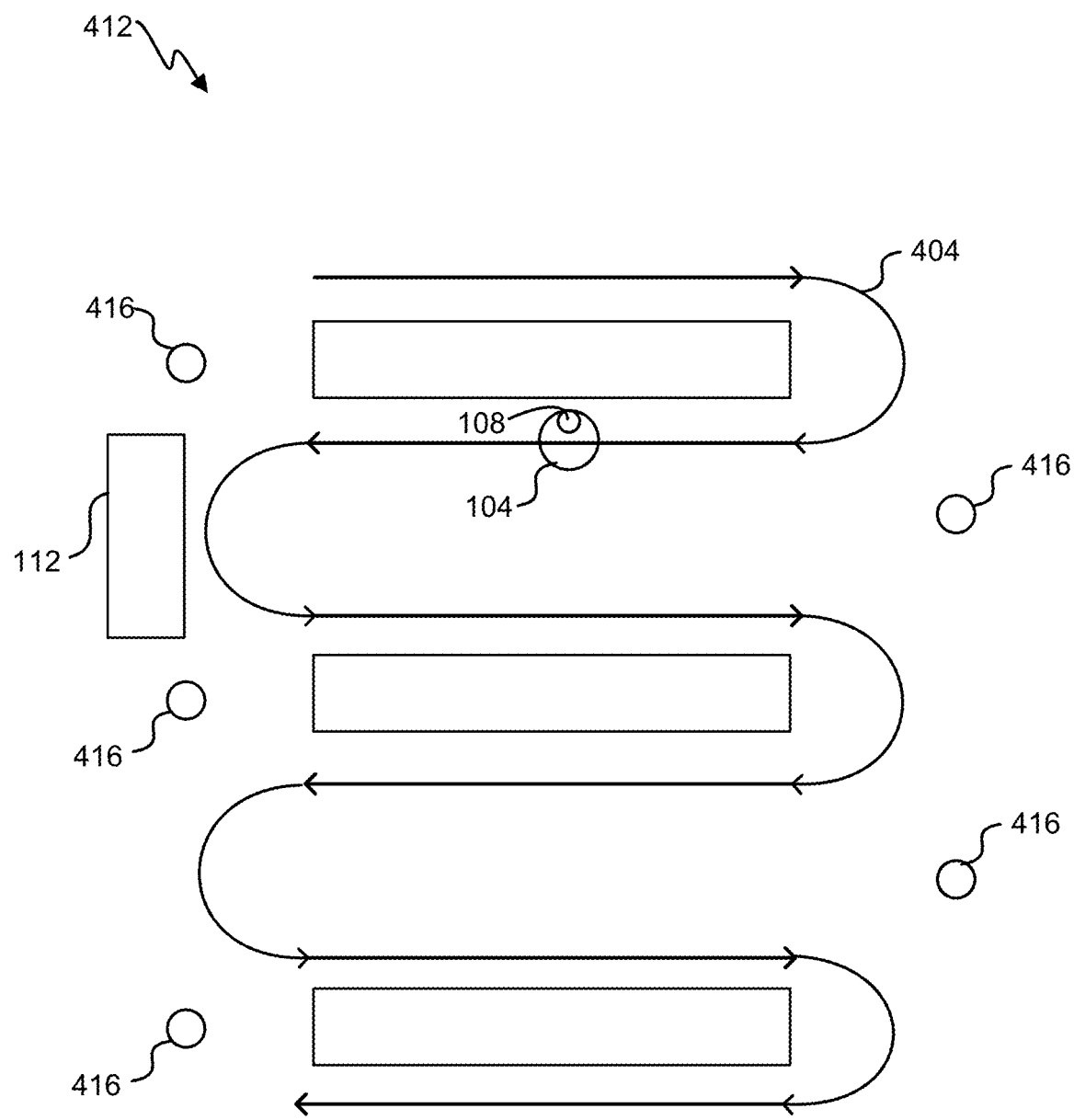
FIG. 4 depicts an embodiment of a path of a vehicle in a retail environment.

FIG. 4 depicts an embodiment of a path 404 of a vehicle 104 in a retail environment 412. The path 404 can be a predefined path and/or a tracked path. For example, the vehicle 104 could travel a predefined path, the vehicle 104 travels the path 404 and uses one or more sensors to track a position of or navigate through the retail environment 412. For example, the one or more sensors could be or use GPS, WiFi, Bluetooth, inertial sensors, computer vision, tracking cameras, and/or ultra-wide band (UWB) technology. Images acquired by the camera 108 attached to the vehicle 104 are linked to a position of the vehicle 104 and/or orientation of the camera 108 at times the images are acquired and used to generate a map of products within the retail environment 412 (e.g., to an accuracy of a shelf, bin, aisle, and/or shelving unit 112).

The vehicle 104 can be tracked indoor and/or outdoor. For example, GPS can be used for outdoor tracking. However, GPS can be blocked in some indoor environments. In some embodiments, UWB technology (e.g., integrated with a mobile device and/or integrated with the vehicle), RF emitters, WiFi, and/or Bluetooth can be used for indoor tracking. FIG. 4 depicts UWB transmitters 416 within the retail environment 412 for navigation and/or tracking using UWB technology.

In some embodiments, the retail environment 412 is indoors; and a method comprises tracking the vehicle 104 in the retail environment 412, and linking position data of the vehicle 104 with a plurality of images acquired by the camera 108 of the vehicle 104.

In some embodiments, data collection is incidental to the primary use of the vehicle 104. For example, the vehicle 104 could be a ride-on floor sweeper (e.g., with camera 108 attached). As the ride-on floor sweeper is cleaning the floor of the retail environment, the camera 108 acquires images of the shelving units 112. In some-embodiments, the ride-on floor sweeper is configured to travel along the path 404 autonomously (e.g., no person riding). In another example, the camera 108 could be put on a shopping cart (e.g., the shopping cart is the vehicle 104). The camera 108 on the shopping cart or on a basket (e.g., shopping basket, bicycle basket) could be used to collect data in a store (e.g., while moved or carried by a customer) or to scan license plates in a parking lot or garage (e.g., to check for parking compliance by scanning license plates of cars in the large parking lot or garage. Or a drone could autonomously fly through a warehouse at different levels (e.g., 2, 3, 4, 5, or more different levels) along the path 404 to acquire inventory in the warehouse (or retail store or other facility).

In some embodiments, the plurality of images acquired by the camera 108, and/or the plurality of image segments, are compressed before analyzing product information on each image segment. In some embodiments, the plurality of images or image segments are received at a remote server for processing (stored on device, e.g., smartphone, tablet, or specialized computer; and then transferred in bulk from the device to the server).

Figure 5A:
FIGS. 5A-5D depict example embodiments of labels.
Figure 5B:
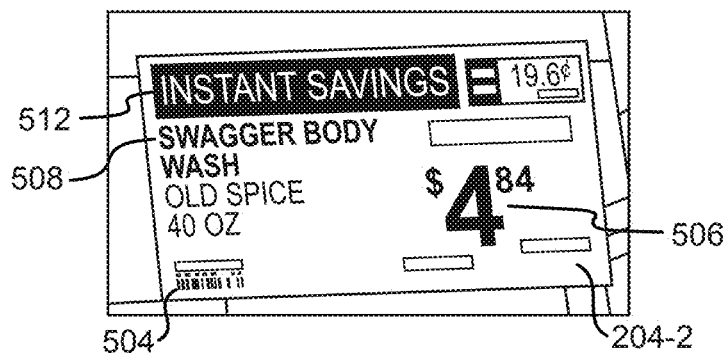
Figure 5C:
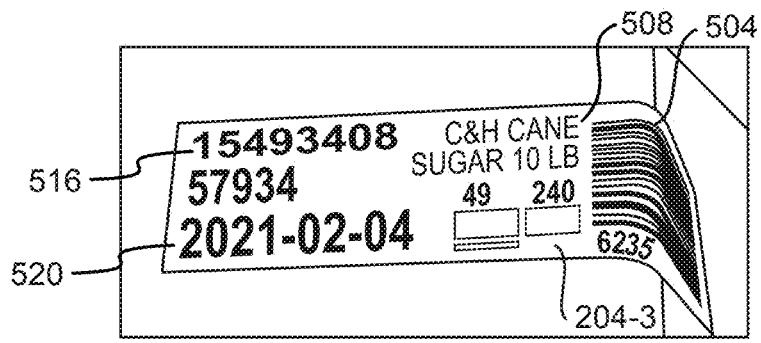
Figure 5D:

FIG. 5A-5D depict embodiments of labels 204. FIG. 5A depicts an embodiment of a first label 204-1. FIG. 5B depicts an embodiment of a second label 204-2. FIG. 5C depicts an embodiment of a third label 204-3. FIG. 5D depicts an embodiment of a fourth label 204-4.

The labels 204 in FIG. 5 comprise a barcode 504 and product information. Product information can include a price 506 (e.g., the first label 204-1, the second label 204-2, and the fourth label 204-4) and/or a description 508. The product information may contain additional information. For example, the second label 204-2 includes a promotion 512, and the third label 204-3 includes pallet number 516 and a date 520. Promotion expiration can be checked when mapping products. For example, a catalog description can contain data about when a promotion expires. If the promotion 512 is on a label 204 and the promotion has expired, or is about to expire, then a flag can be generated (e.g., with a work order) so the label 204 can be updated. Similarly, if a promotion is in the catalog data and the label 204 fails to indicate the promotion, then a flag can be generated so that the label can be updated.

In some embodiments, a subset of characters of the product information are selected as a scan description based on the subset of characters being located in a particular area of a label of the plurality of labels. For example, text in the upper half, or upper left quadrant, or lower right quadrant of the label is used. For example, the description 508 is shown in the upper left of the label 204 in FIGS. 5A, 5B, and 5D; and the price 506 is shown in the lower right quadrant of labels in FIGS. 5A, 5B, and 5D.

In some embodiments, matching scan descriptions to catalog descriptions comprises measuring a relative Levenshtein distance between at least a portion of a scan description to catalog descriptions. For example, the descriptions 508 in the first label 204-1, the second label 204-2, and the fourth label 204-4 comprise multiple lines. The first line, or part of the first line, in each description could be used to calculate a relative Levenshtein distance, wherein the relative Levenshtein distance measures a difference between two sequences (e.g., where distance is measured by a number of single character edits to get the two strings to match relative to the sequence length). Though using a Levenshtein distance is one possible method for matching, another metric might be used in conjunction with, or in lieu of, using the Levenshtein distance.

In some environments, some parts of optical patterns, such as the description, can be obscured or difficult to read. For example, the label 204 could be under plastic, partially coming off (e.g., rippled or lifted edges), or partially covered (e.g., with dirt or by another object, such as bar showing in FIG. 5D partially blocking the description 508), which can make decoding the product information challenging. In some embodiments, one or more lines of text and/or the price can be matched to make decoding more robust. For example, the description 508 in the fourth label 204-4, depicted in FIG. 5D, was correctly decoded based on a unique first line match of the description 508, even though the description was partially obscured.

Error detection can be useful to flag that a label 204 was not correctly decoded. OCR does not normally provide error detection. Thus a label 204 could be decoded incorrectly, and the user would not necessarily know the label 204 was decoded incorrectly. For example, a "Q" could be decoded as an "O" when using optical character recognition.

In some embodiments, error detection is used to more confidently match scan descriptions to catalog descriptions. Some examples of error detection that can be implemented include one or more of the following examples:

Redundancy. In some embodiments, a label 204 is imaged about 10 times (e.g., 5-15 times, based on the speed of a vehicle). If a label is imaged multiple times, then a probability (e.g., a confidence) of a correct match between a scan description and a catalog description can be increased. For example, glare from a light might make decoding of a label 204 difficult in two or three images, but as the vehicle moves the glare moves and the label 204 is decoded in other images. In some embodiments, a scan description is matched to a catalog description based on which catalog description is linked to the scan description more often. For example, if there are 10 images of a label 204 and two are decoded and linked to a first catalog description, and eight are decoded and linked to a second catalog description, the label 204 would be matched to the second catalog description, because over half the images of the same label are linked to the second catalog description. However, some errors are seen in all images (e.g., dirt on a label could change OCR of a character in all instances of a label), so additional error detection can be used.

Starting string. Some numbers are expected to start with certain characters (e.g., with 00 or 01). If second digit is not a 0 or 1, then the decoding can be flagged or thrown out. For example, the date 520 on the third label 204-3 is known to start with "2021." If the date 520 is decoded to start with digits other than 2021, then an error flag could be generated.

A character string (e.g., a number string and/or letter string) could have error correction. Characters could be used to have parity or a hash number and/or bits.

Pallet number. A pallet log could be used to confirm a decoded number. For example, the third label 204-3 comprises a pallet number 516. The pallet number 516 starts with "15". A pallet log could be checked to confirm some (e.g., one or two starting or ending digits) or all of the pallet number 516). Other number strings, in addition to or in lieu of, the pallet number 516 could be used to match a label to a catalog description and/or for error detection.

Length of string; If a string has a known length, and the decoded string has a different length, then the decoded string could be flagged and/or thrown out. For example, if the pallet number 516 on the third label 204-3 is being used for matching, and an OCR of the pallet number 516 generated a string with seven or fewer number or nine or greater numbers, then an error flag could be generated because the pallet number 516 is known to have eight digits.

Parity. In some embodiments, numbers and/or letters (e.g., symbols) on a label are generated using parity symbols or hash symbols. Error detection can be implemented using the parity or hash symbols.

After an optical pattern is decoded (e.g., the description 508 is OCR'd) to obtain a scan description, the scan description is matched to a catalog description. In some embodiments, a Levenshtein distance is used to match the scan description to the catalog description. The Levenshtein distance compares two strings that are not identical.

Figure 6:
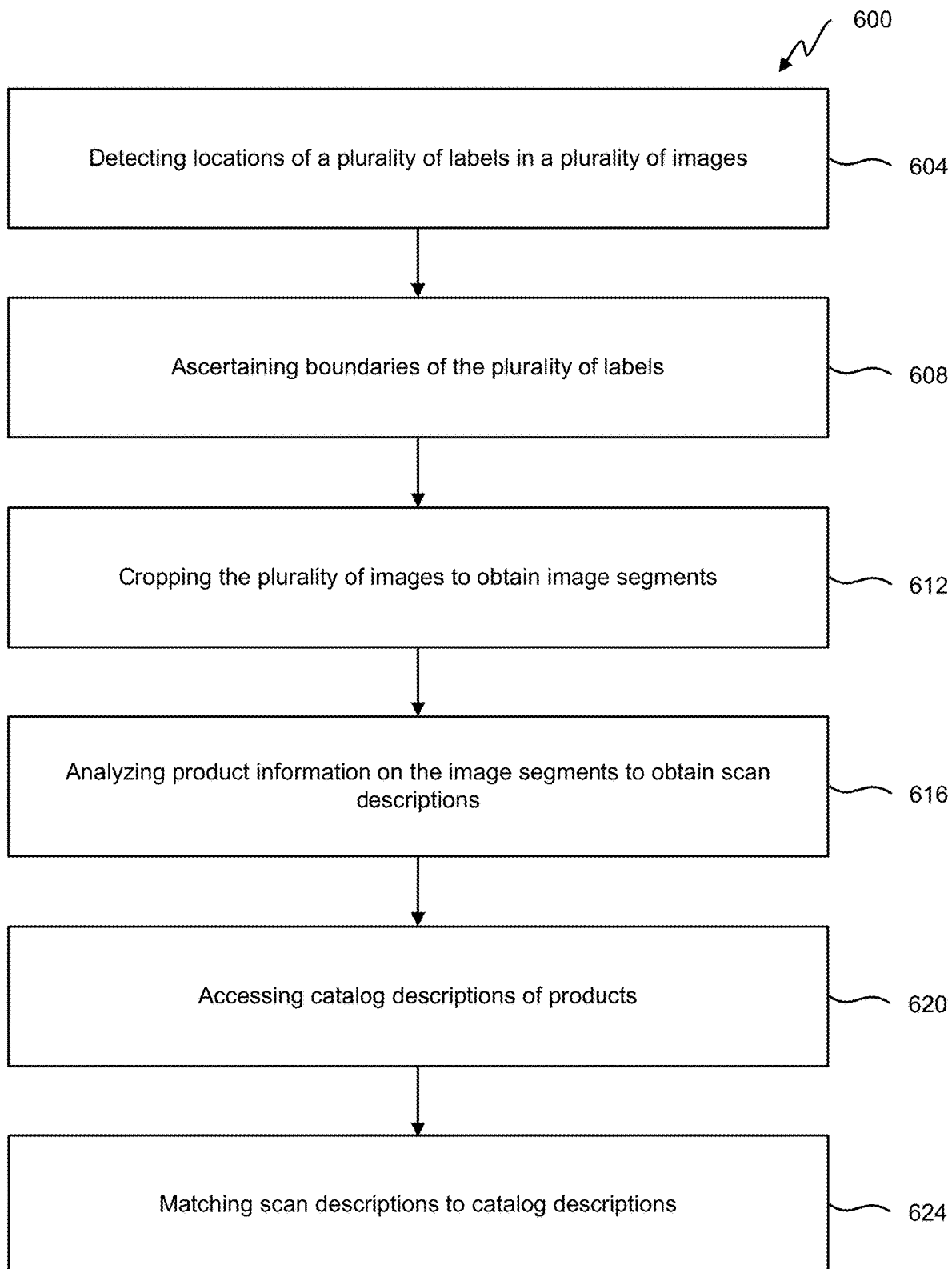
FIG. 6 illustrates a flowchart of an embodiment of a process for recognition of optical patterns in an image.

FIG. 6 illustrates a flowchart of an embodiment of a process 600 for recognition of optical patterns in an image. The optical patterns can be OCR'd to match label information to a catalog description and/or catalog entry (e.g., to retrieve a SKU). The process begins in step 604 with detecting locations of a plurality of labels in a plurality of images received. The plurality of images are of shelf displays in a retail environment. For example, the plurality of images are acquired by the camera 108 attached with the vehicle 104 in FIG. 4. The plurality of labels each contain a barcode and product information of a product for sale in the retail environment. The product information contains letters and/or numbers. For example, the product information can include a price 506, a description 508, a pallet number 516, and/or a date 520 as shown on labels 204 in FIGS. 5A-5C. For example, the labels 204 in FIG. 2 are identified.

In step 608, boundaries of the plurality of labels in the plurality of images are ascertained. For example, boundaries of labels 204 in FIG. 2 are identified using a gradient-analysis algorithm. The plurality of images are then cropped to obtain a plurality of image segments, step 612, based on ascertaining boundaries of the plurality of labels in the plurality of images. For example, image segments 208 in FIG. 2 are cropped from the image 200 and other images.

In step 616, product information on each image segment of the plurality of image segments are analyzed to obtain a plurality of scan descriptions, without decoding barcodes on the plurality of labels. For example, the description 508 in FIG. 5A is OCR'd without decoding the barcode 504.

A database comprising a plurality of catalog descriptions of products in the retail environment is accessed, step 620. The scan descriptions are compared to the catalog descriptions to match scan descriptions to the catalog descriptions, step 624.

In some embodiments, location data of a vehicle and/or orientation of one or more cameras attached with the vehicle, time synchronized with acquisition of the plurality of images by the one or more cameras (e.g., position data of images within the retail environment), is received and used to create a map of product locations within the retail environment. For example, the catalog descriptions each comprise a SKU. Shelves within the retail environment are identified by a location code. SKUs of products are then matched to location codes of the retail environment. This can be beneficial for locating product within the retail environment as product is added to, moved within, and/or removed from the retail environment.

Figure 7:
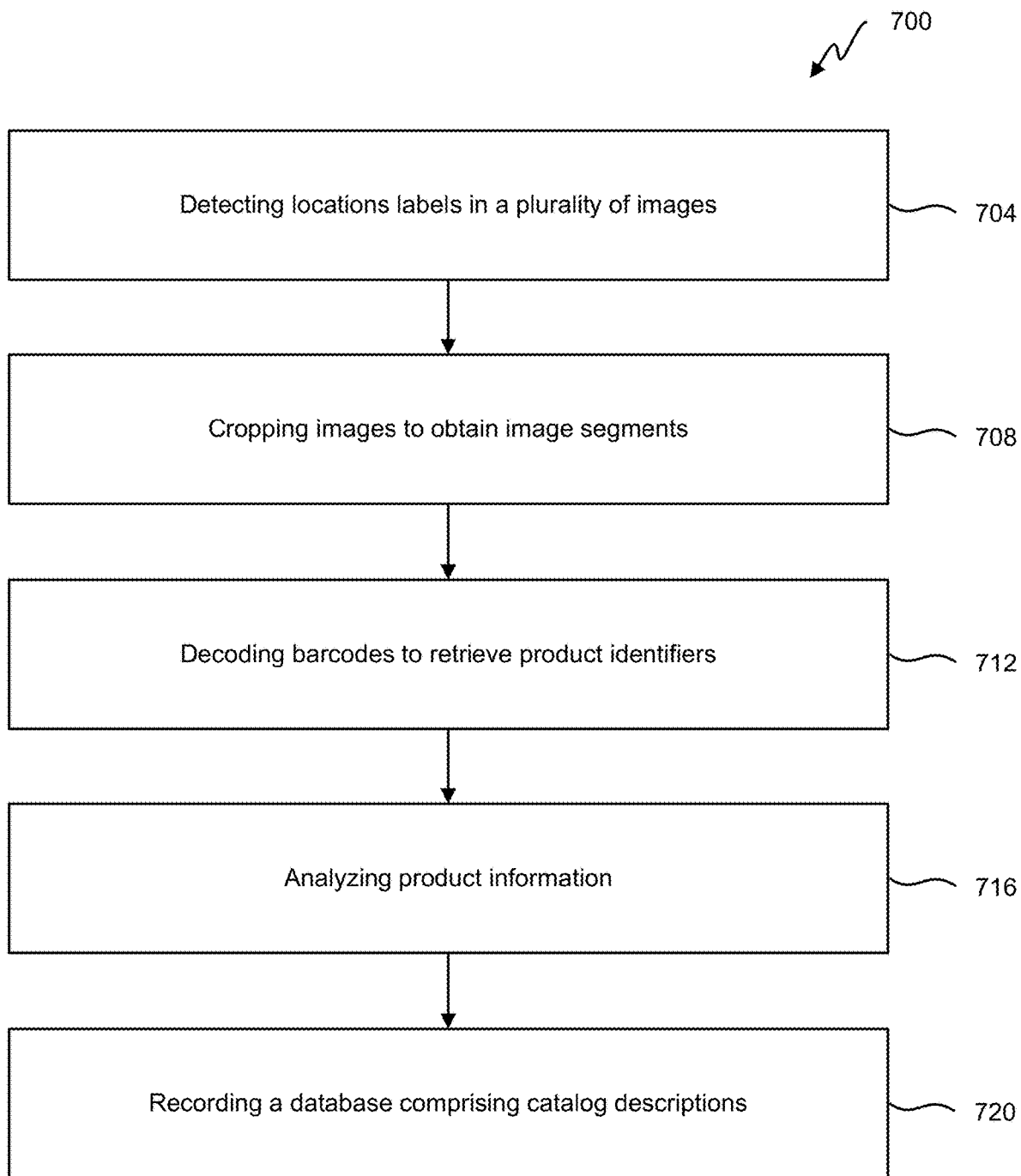
FIG. 7 illustrates a flowchart of an embodiment of a process for creating a catalog of product descriptions.

FIG. 7 illustrates a flowchart of an embodiment of a process 700 for creating a catalog of product descriptions. In some configurations, high-resolution images (e.g., higher resolution images than used for process 600 described in FIG. 6) are used to create a catalog. Applicant has found that some catalogs are incomplete and/or inaccurate. Accordingly, images can be used to build a catalog. However, using higher resolution images can take more time and/or computing resources. A catalog can be built less frequently, such as every quarter (e.g., every 3 months) and inventory data and/or data of location of inventory can be acquired daily, weekly, or every other week (e.g., as described in conjunction with FIG. 6). Accordingly, building the catalog can occur less frequently than mapping locations of products.

As an example, high resolution images are used to decode barcodes on labels 204 in FIGS. 5A-5D; descriptions 508 are OCR'd; prices 506 are OCR'd; and/or other information (e.g., pallet number 516 and/or date 520) is decoded to build the catalog database and/or build a first map of product within a store. Later, lower resolution images are used to map product within the store to build a second map. The second map is then compared to the first map to identify product addition, changes, and/or removal.

Process 700 begins with step 704, detecting locations of labels in a plurality of images. The plurality of images are high resolution. In some embodiments, high resolution is defined by resolution sufficient to decode barcodes on the labels (e.g., wherein barcodes on labels are smaller than descriptions on the labels). For example, the plurality of images are acquired by the camera 108 attached with the vehicle 104 in FIG. 4, and the camera acquires the plurality of images at a high resolution and/or the images are not down sampled for transmission and/or processing. The plurality of labels each contain a barcode and product information of a product for sale in the retail environment; and the product information contains letters and/or numbers.

In step 708, the plurality of images are cropped to obtain a plurality of image segments. Cropping is based on detecting locations of labels in the plurality of images, wherein an image segment comprises at least a portion of a label.

In step 712, the barcodes are decoded to retrieve product identifiers. For example, barcodes are decoded to retrieve SKUs. In step 716, product information is analyzed on each segment of the plurality of image segments to obtain a plurality of catalog descriptions. For example, description 508 in FIGS. 5A-5D are OCR'd. In step 720, information is recorded in a database comprising the catalog descriptions of products in the retail environment along with the product identifiers.

In some embodiments, as a catalog is being generated a determination is made on how many lines of description are to be used to match with scan descriptions. For example, on some apparel labels, three lines of description are the same between labels, but the price is different. In other situations, the first line is unique between labels.

Figure 8:
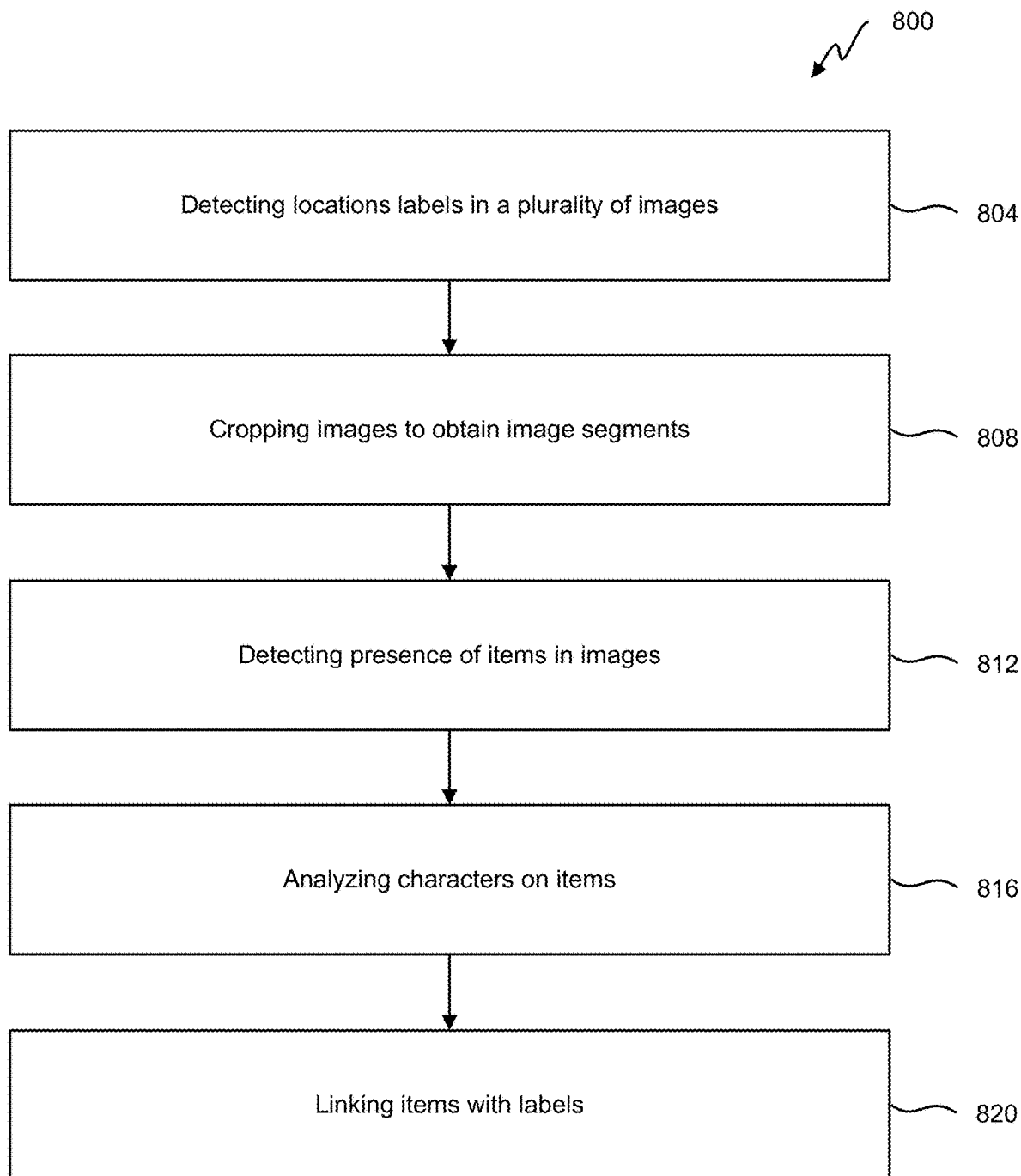
FIG. 8 illustrates a flowchart of an embodiment of a process for linking items with a catalog description.

FIG. 8 illustrates a flowchart of an embodiment of a process 800 for linking items with catalog entries. The process uses information about products themselves (e.g., in addition to information from labels on shelves). The process begins with acquiring a plurality of images (e.g., high or low resolution images) of a plurality of shelf displays in a retail environment. In step 804, locations of a plurality of labels in the plurality of images (step 804) are detected. The plurality of labels each contain a barcode and product information of a product for sale in the retail environment. The product information contains letters and/or numbers.

In step 808, the plurality of images are cropped to obtain a plurality of image segments, based on detecting locations of labels in the plurality of images. An image segment comprises at least a portion of a label.

In step 812, presence of items (e.g., products for sale) in the plurality of images are detected. The items contain at least some alphanumeric characters on the item packaging. The at least some alphanumeric characters on the packaging are analyzed, step 816. Items are linked with shelf labels (e.g., to build a catalog), step 820.

In some embodiments, a method includes: detecting an object of interest, typically a label using image segmentation or object recognition; identify the object of interest by decoding its barcode, analyzing its visual appearance, or decoding alphanumeric characters associated with the object; comparing the detection results against a set of constraints; and/or comparing the detection results against a known list of allowed objects.

In some embodiments, a method includes: recording an image of shelf display; detecting price labels depicted in the image; OCR alphanumeric characters on label cutouts; selecting a subset of characters in a particular area of the label; and/or comparing characters to a known list of items (catalog) (e.g., measuring the Levenshtein distance between the detected strings and the catalogue description).

Sample Computing Device

Figure 9:
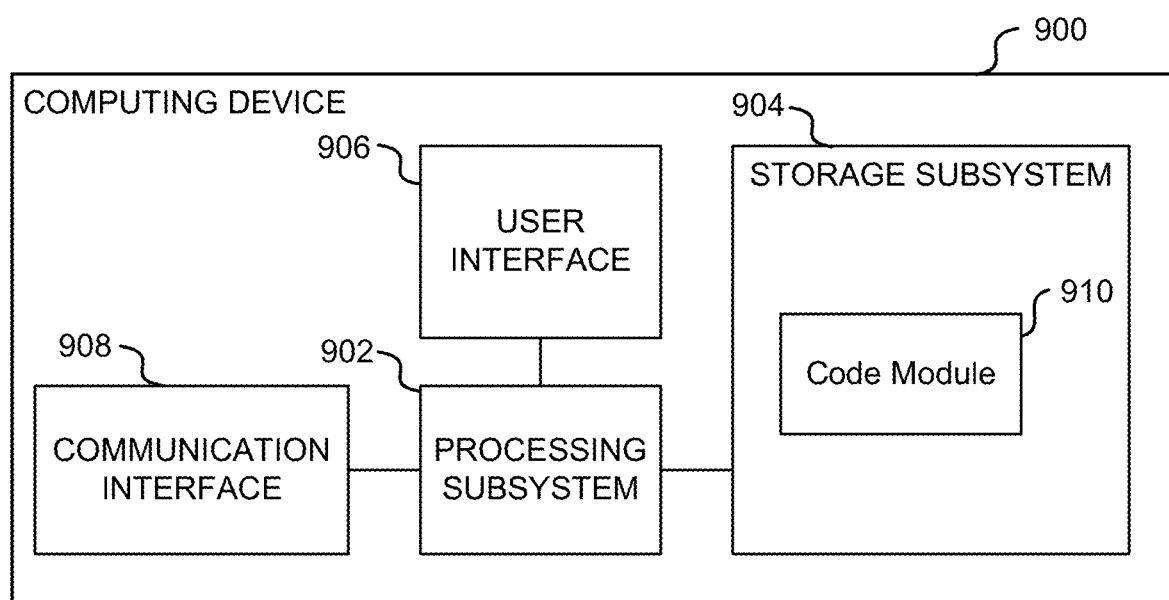
FIG. 9 depicts a block diagram of an embodiment of a computer system.

FIG. 9 is a simplified block diagram of a computing device 900. Computing device 900 can implement some or all functions, behaviors, and/or capabilities described above that would use electronic storage or processing, as well as other functions, behaviors, or capabilities not expressly described. Computing device 900 includes a processing subsystem 902, a storage subsystem 904, a user interface 906, and/or a communication interface 908. Computing device 900 can also include other components (not explicitly shown) such as a battery, power controllers, and other components operable to provide various enhanced capabilities. In various embodiments, computing device 900 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 904 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 904 can store one or more applications and/or operating system programs to be executed by processing subsystem 902, including programs to implement some or all operations described above that would be performed using a computer. For example, storage subsystem 904 can store one or more code modules 910 for implementing one or more method steps described above.

A firmware and/or software implementation may be implemented with modules (e.g., procedures, functions, and so on). A machine-readable medium tangibly embodying instructions may be used in implementing methodologies described herein. Code modules 910 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 910) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 910 may comprise sets of instructions (codes) embodied on a computer-readable medium that directs a processor of a computing device 900 to perform corresponding actions. The instructions may be configured to run in sequential order, in parallel (such as under different processing threads), or in a combination thereof. After loading a code module 910 on a general purpose computer system, the general purpose computer is transformed into a special purpose computer system.

Computer programs incorporating various features described herein (e.g., in one or more code modules 910) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 904 can also store information useful for establishing network connections using the communication interface 908.

User interface 906 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 906 to invoke the functionality of computing device 900 and can view and/or hear output from computing device 900 via output devices of user interface 906. For some embodiments, the user interface 906 might not be present (e.g., for a process using an ASIC).

Processing subsystem 902 can be implemented as one or more processors (e.g., integrated circuits, one or more single-core or multi-core microprocessors, microcontrollers, central processing unit, graphics processing unit, etc.). In operation, processing subsystem 902 can control the operation of computing device 900. In some embodiments, processing subsystem 902 can execute a variety of programs in response to program code and can maintain multiple concurrently executing programs or processes. At a given time, some or all of a program code to be executed can reside in processing subsystem 902 and/or in storage media, such as storage subsystem 904. Through programming, processing subsystem 902 can provide various functionality for computing device 900. Processing subsystem 902 can also execute other programs to control other functions of computing device 900, including programs that may be stored in storage subsystem 904.

Communication interface 908 can provide voice and/or data communication capability for computing device 900. In some embodiments, communication interface 908 can include radio frequency (RF) transceiver components for accessing wireless data networks (e.g., WiFi network; 3G, 4G/LTE; etc.), mobile communication technologies, components for short-range wireless communication (e.g., using Bluetooth communication standards, NFC, etc.), other components, or combinations of technologies. In some embodiments, communication interface 908 can provide wired connectivity (e.g., universal serial bus, Ethernet, universal asynchronous receiver/transmitter, etc.) in addition to, or in lieu of, a wireless interface. Communication interface 908 can be implemented using a combination of hardware (e.g., driver circuits, antennas, modulators/demodulators, encoders/decoders, and other analog and/or digital signal processing circuits) and software components. In some embodiments, communication interface 908 can support multiple communication channels concurrently. In some embodiments the communication interface 908 is not used.

It will be appreciated that computing device 900 is illustrative and that variations and modifications are possible. A computing device can have various functionality not specifically described (e.g., voice communication via cellular telephone networks) and can include components appropriate to such functionality.

Further, while the computing device 900 is described with reference to particular blocks, it is to be understood that these blocks are defined for convenience of description and are not intended to imply a particular physical arrangement of component parts. For example, the processing subsystem 902, the storage subsystem, the user interface 906, and/or the communication interface 908 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments can be realized in a variety of apparatus including electronic devices implemented using a combination of circuitry and software. Electronic devices described herein can be implemented using computing device 900.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A number of variations and modifications of the disclosed embodiment(s) can also be used. For example, though several embodiments are for shelves in a store, other environments could be coded and/or visualized. For example, a warehouse, a logistics facility, a storage facility, a postal or parcel facility, supplies at an auto repair shop, or art supplies at a university can be tracked and/or visualized.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A system comprising:
   one or more cameras;
   one or more processors; and
   one or more computer readable storage media storing instructions which, when executed by the one or more processors, cause the system to perform operations comprising:
   acquiring a plurality of images of a plurality of objects in an environment;
   down sampling at least one image of the plurality of images, wherein down sampling the at least one image causes the at least one image to have a lower resolution than at least one other image of the plurality of images;
   detecting locations of a plurality of labels in the plurality of images, each label of the plurality of labels corresponding to a respective object of the plurality of objects;
   cropping the plurality of images to obtain a plurality of image segments, each image segment of the plurality of image segments corresponding to a respective label of the plurality of labels, depicting product information, and depicting a barcode associated with the product information; and
   for each respective image segment of the plurality of image segments:
   analyzing the product information of the respective image segment to obtain a catalog description for the respective image segment, wherein analyzing the product information comprises analyzing lines of text of the product information;
   storing the catalog description in a database, wherein the catalog description is stored as an entry in a catalog of product descriptions stored in the database;
   decoding the barcode to obtain a product identifier for the respective image segment; and
   storing the product identifier in the database in association with the catalog description.

2. The system of claim 1, wherein each object of the plurality of objects corresponds to a product for sale in a retail environment.

3. The system of claim 1, wherein the database stores a plurality of catalog descriptions of the plurality of objects, each catalog description of the plurality of catalog descriptions comprising at least one of a product identifier for an object of the plurality of objects and product information for an object of the plurality of objects.

4. The system of claim 1, wherein each object of the plurality of objects is represented as a separate entry in the catalog of product descriptions.

5. The system of claim 1, wherein the environment is a retail environment, and wherein the plurality of objects is located on a plurality of shelf displays in the retail environment.

6. The system of claim 1, wherein analyzing the product information comprises performing optical character recognition on the lines of text.

7. The system of claim 1, the system further comprising a vehicle coupled to the one or more cameras, and wherein acquiring the plurality of images comprises capturing the plurality of images using the one or more cameras as the vehicle moves within the environment.

8. The system of claim 1, wherein the respective image segment is associated with an object of the plurality of objects and the product identifier for the respective image segment is a stock keeping unit for the object.

9. A method comprising:
   acquiring, using one or more cameras coupled to a vehicle, a plurality of images of a plurality of products in a retail environment;
   down sampling at least one image of the plurality of images, wherein down sampling the at least one image causes the at least one image to have a lower resolution than at least one other image of the plurality of images;
   detecting locations of a plurality of labels in the plurality of images, each label of the plurality of labels corresponding to a respective object of the plurality of products;
   cropping the plurality of images to obtain a plurality of image segments, each image segment of the plurality of image segments corresponding to a respective label of the plurality of labels, depicting product information, and depicting a barcode associated with the product information; and
   for each respective image segment of the plurality of image segments:
   analyzing the product information of the respective image segment to obtain a catalog description for the respective image segment, wherein analyzing the product information comprises analyzing lines of text of the product information;
   storing the catalog description in a database, wherein the catalog description is stored as an entry in a catalog of product descriptions stored in the database;
   decoding the barcode to obtain a product identifier for the respective image segment; and
   storing the product identifier in the database in association with the catalog description.

10. The method of claim 9, wherein each object of the plurality of products corresponds to a product for sale in a retail environment.

11. The method of claim 9, wherein the database stores a plurality of catalog descriptions of the plurality of products, each catalog description of the plurality of catalog descriptions comprising at least one of a product identifier for a product of the plurality of products and product information for a product of the plurality of products.

12. The method of claim 9, wherein each object of the plurality of products is represented as a separate entry in the catalog of product descriptions.

13. The method of claim 9, wherein analyzing the product information comprises performing optical character recognition on the lines of text.

14. The method of claim 9, wherein the respective image segment is associated with an object of the plurality of products and the product identifier for the respective image segment is a stock keeping unit for the object.

15. The method of claim 9, wherein the plurality of products is located on a plurality of shelf displays in the retail environment.

16. The method of claim 15, wherein acquiring the plurality of images comprises capturing the plurality of images using the one or more cameras as the vehicle moves between two or more shelf displays of the plurality of shelf displays.

17. One or more non-transitory computer-readable media storing computer-readable instructions which, when executed by one or more processors of a system, cause the system to perform operations comprising:
   acquiring, using one or more cameras coupled to a vehicle, a plurality of images of a plurality of objects in an environment;
   down sampling at least one image of the plurality of images, wherein down sampling the at least one image causes the at least one image to have a lower resolution than at least one other image of the plurality of images;
   detecting locations of a plurality of labels in the plurality of images, each label of the plurality of labels corresponding to a respective object of the plurality of objects;
   cropping the plurality of images to obtain a plurality of image segments, each image segment of the plurality of image segments corresponding to a respective label of the plurality of labels, depicting product information, and depicting a barcode associated with the product information;
   for each respective image segment of the plurality of image segments:
   analyzing the product information of the respective image segment to obtain a catalog description for the respective image segment, wherein analyzing the product information comprises analyzing lines of text of the product information;
   storing the catalog description in a database, wherein the catalog description is stored as an entry in a catalog of product descriptions stored in the database;
   decoding the barcode to obtain a product identifier for the respective image segment; and
   storing the product identifier in the database in association with the catalog description.

18. The one or more non-transitory computer-readable media of claim 17, wherein acquiring the plurality of images comprises capturing the plurality of images using the one or more cameras as the vehicle move within a retail environment.

19. The one or more non-transitory computer-readable media of claim 17, wherein each object of the plurality of objects corresponds to a product for sale in a retail environment.

20. The one or more non-transitory computer-readable media of claim 17, wherein each object of the plurality of objects corresponds to a product for sale in a retail environment.

* * * * *